United States Patent
Shelton et al.

(10) Patent No.: US 7,647,722 B2
(45) Date of Patent: Jan. 19, 2010

(54) CAPPED SKIRT FOR FISHING

(75) Inventors: Michael T. Shelton, North Charleston, SC (US); Daryl W. Greene, Pawleys Island, SC (US); Van Truong, Huyen Cu Chi (VN)

(73) Assignee: Z-Man Fishing Products, Inc., Ladson, SC (US)

( * ) Notice: Subject to any disclaimer, the term of this patent is extended or adjusted under 35 U.S.C. 154(b) by 0 days.

(21) Appl. No.: 11/996,635

(22) PCT Filed: Aug. 10, 2006

(86) PCT No.: PCT/US2006/031203

§ 371 (c)(1),
(2), (4) Date: Jun. 16, 2008

(87) PCT Pub. No.: WO2007/021843

PCT Pub. Date: Feb. 22, 2007

(65) Prior Publication Data

US 2008/0295385 A1    Dec. 4, 2008

Related U.S. Application Data

(60) Provisional application No. 60/707,142, filed on Aug. 10, 2005, provisional application No. 60/783,199, filed on Mar. 16, 2006.

(51) Int. Cl.
*A01K 85/00* (2006.01)
(52) U.S. Cl. ...................................... 43/42.53; 43/42.28
(58) Field of Classification Search ................ 43/42.53, 43/42.28, 42.24
See application file for complete search history.

(56) References Cited

U.S. PATENT DOCUMENTS

| | | | | |
|---|---|---|---|---|
| 2,365,502 A | * | 12/1944 | Weesner | 43/42.28 |
| 2,618,094 A | * | 11/1952 | Shindler | 43/42.53 |
| 2,686,382 A | * | 8/1954 | Fisher | 43/42.28 |
| 3,021,632 A | * | 2/1962 | Gombar | 43/42.28 |
| 3,060,620 A | * | 10/1962 | Binkowski | 43/42.28 |
| 3,883,979 A | * | 5/1975 | Williams, Jr. | 43/42.53 |
| 4,307,531 A | * | 12/1981 | Honse | 43/42.24 |
| 4,335,495 A | * | 6/1982 | Buchanan | 43/42.53 |
| 4,619,067 A | * | 10/1986 | West | 43/42.28 |
| 4,712,325 A | * | 12/1987 | Smith | 43/42.28 |
| 4,741,120 A | * | 5/1988 | Cota et al. | 43/42.53 |
| 4,831,770 A | * | 5/1989 | Dworski | 43/42.28 |
| 5,007,193 A | * | 4/1991 | Goodley et al. | 43/42.53 |
| 5,018,297 A | * | 5/1991 | Kennedy, Jr. | 43/42.53 |
| 5,251,395 A | * | 10/1993 | Wicklund | 43/42.53 |

(Continued)

*Primary Examiner*—Darren W Ark
(74) *Attorney, Agent, or Firm*—Hammer & Associates, P.C.

(57) ABSTRACT

A method of making a skirt which comprises: providing a silicone sheet having a tab and a plurality of cut strands, applying an adhesive to the first side and rolling the first side of the silicone sheet about a non-stick whipping to form a skirt insert. A cap is provided where the cap is tubular having a first open end and a closed second end, the second end has an orifice and a tubular portion having an inside surface. An adhesive is applied to the inside surface of the tubular portion. The skirt insert is then inserted into the open end of the cap to form a skirt and the non-stick whipping is inserted through the orifice of the cap. The adhesive on the skirt insert and the cap is then cured to form a skirt. After curing the non-stick whipping is removed form the skirt.

12 Claims, 4 Drawing Sheets

U.S. PATENT DOCUMENTS

| | | | | |
|---|---|---|---|---|
| 5,893,231 A * | 4/1999 | Kato | ............... | 43/42.24 |
| 5,960,580 A * | 10/1999 | Link | ............... | 43/42.53 |
| 6,061,948 A * | 5/2000 | Boucek | ............... | 43/42.53 |
| 6,082,038 A * | 7/2000 | Link | ............... | 43/42.24 |
| 6,205,697 B1 * | 3/2001 | Kent | ............... | 43/42.53 |
| 6,272,787 B1 * | 8/2001 | Link | ............... | 43/42.53 |
| 6,418,659 B1 * | 7/2002 | Shelton | ............... | 43/42.53 |
| 6,598,336 B2 * | 7/2003 | Link | ............... | 43/42.28 |
| 6,675,525 B1 * | 1/2004 | Ford | ............... | 43/42.53 |

* cited by examiner

US 7,647,722 B2

CAPPED SKIRT FOR FISHING

RELATED CASES

This application claims the Priority of the Provisional Application Ser. No. 60/707,142 filed Aug. 10, 2005, and Provisional Application Ser. No. 60/783,199 filed Mar. 16, 2006.

BACKGROUND OF THE INVENTION

The present invention relates to a capped fishing skirt and a method of making the same.

Fishing skirts generally comprise a head or collar member and a plurality of attached trailing strands made from an elastomer. The strands of the skirt tend to pulsate as the skirt is pulled through the water which attracts fish. These strands can also function to conceal a hook. A skirt can be formed from a flat sheet of cured elastomer which is cut to have a tab at one end and elongate trailing filaments at the other end. The skirt is generally wrapped around a lure such as a jig or spinner in the form of a tube and attached by securing the waistband around a portion of the lure, usually a groove or collar on the lure. The skirt may be compounded with various colors, glitter and other visual enhancements to attract fish under various fishing conditions. More than one overlapping skirt can be provided to achieve multiple layers and a variety of effects. The skirt may be attached to the lure by a flexible collar, rubber band, or may be tied on with thread.

Skirts are generally divided into two groups being banded skirts and roll up skirts. With a banded skirt rubber bands and elastomeric collars are frequently used to secure the strands in place. Banded skirts are usually sold to fishing lure manufactures. An example of a banded skirt can be seen in U.S. Pat. No. 5,251,395. The roll up skirt is formed by rolling and bonding the border of a skirt to an elastomeric core piece with an adhesive. The roll up skirts, are often sold directly to fisherman. Some examples of roll up skirts include U.S. Pat. Nos. 5,960,580 and 6,418,659.

One method of making a fishing lure skirt is described in U.S. Pat. No. 5,960,580. In order to make the skirt, an apertured core of cured silicone rubber is provided. The inner surface of the waistband of a skirt blank is coated with a liquid adhesive, wrapped around the core and the adhesive is allowed to cure. To maintain tension on the wrapped portion, apertures must be formed in the waistband and passed over pins to hold the wrapped portion under tension during curing. This is a time consuming process requiring special equipment. Also, there is no opportunity to insert glitter or color to the head of the skirt.

SUMMARY OF THE INVENTION

A method of making a skirt which comprises: providing a silicone sheet having a tab and a plurality of cut strands, applying an adhesive to the first side and rolling the first side of the silicone sheet about a non-stick whipping to form a skirt insert. A cap is provided where the cap is tubular having a first open end and a closed second end, the second end has an orifice and a tubular portion having an inside surface. An adhesive is applied to the inside surface of the tubular portion. The skirt insert is then inserted into the open end of the cap to form a skirt and the non-stick whipping is inserted through the orifice of the cap. The adhesive on the skirt insert and the cap is then cured to form a skirt. After curing the non-stick whipping is removed form the skirt.

BRIEF DESCRIPTION OF THE DRAWINGS

The foregoing will become more readily apparent by referring to the following detailed description and the appended drawings in which.

DETAILED DESCRIPTION OF THE INVENTION

Figure 1:
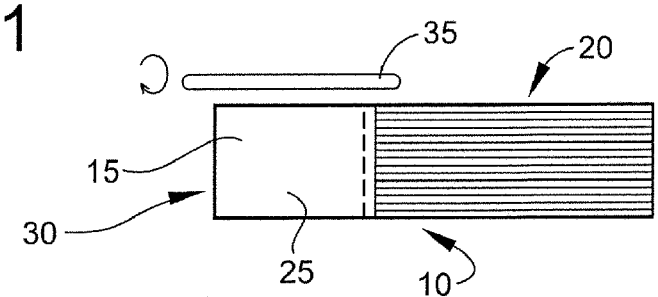
FIG. 1 is a perspective view of the silicone sheet having a tab and a plurality of cut strands.
Figure 2:
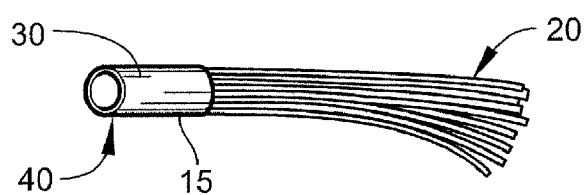
FIG. 2 is a perspective view of the skirt insert.
Figure 3:
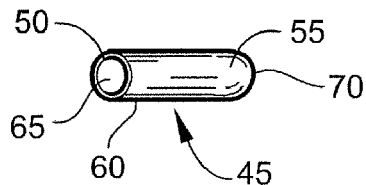
FIG. 3 is a perspective view of the cap.
Figure 6:
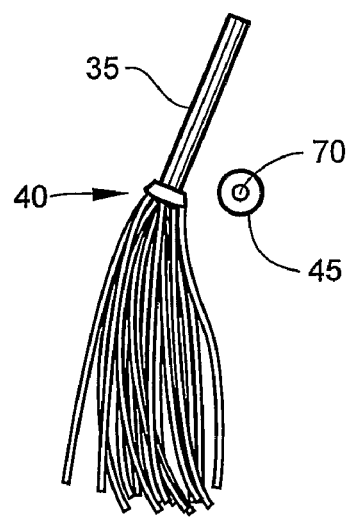
FIG. 6 is a perspective view of the skirt insert with the whipping.
Figure 7:
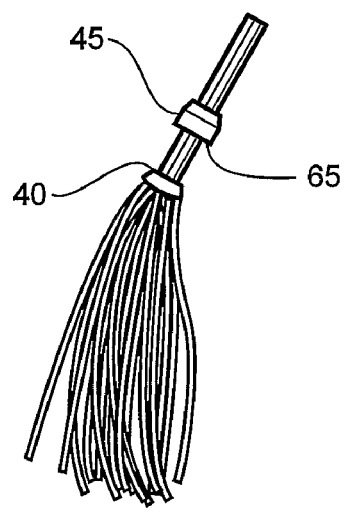
FIG. 7 is a perspective view of the skirt insert, the whipping with the cap being inserted over the skirt insert.
Figure 8:
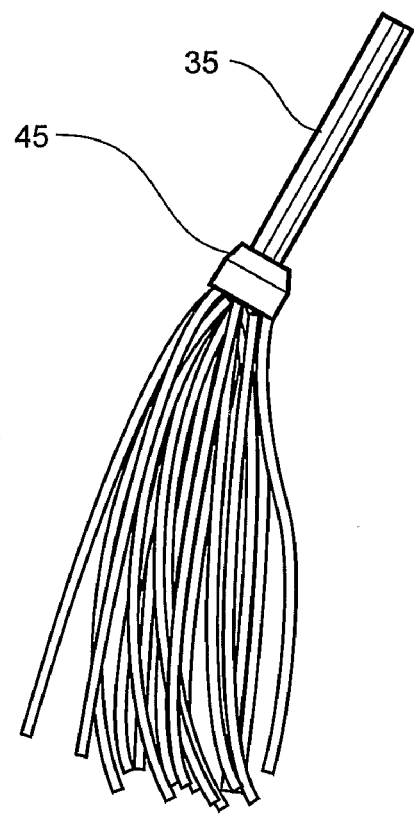
FIG. 8 is a perspective view of the skirt insert with the whipping with the cap positioned in place.
Figure 9:
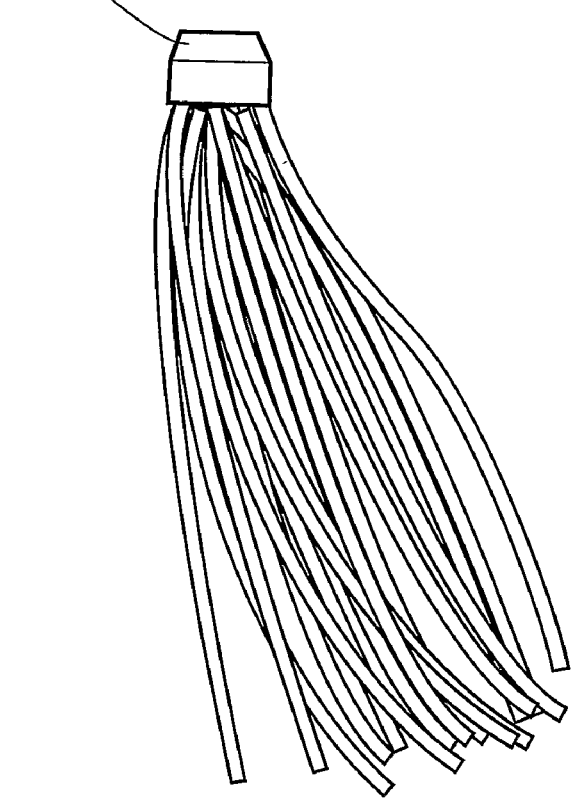
FIG. 9 is a perspective view of the skirt.

A method of making a skirt for a fishing lure which is comprised of the steps of: providing a flexible sheet FIG. 1, 10, having a tab 15 and a plurality of cut strands 20 where the tab 15 has a first side 25 and a second side 30, an adhesive is applied to the first side 25. The first side 25 of the silicone sheet 10 is then rolled about a non-stick whipping 35 to form a skirt insert 40, FIG. 2. A cap FIG. 3, 45, is provided where the cap is tubular having a first open end 50 and a closed second end 55 and a tubular portion 60 having an inside surface 65, the closed end 55, has an orifice 70. In one embodiment of the invention, an adhesive is applied to the inside surface 65 of the tubular portion 60. Then the skirt insert 40 is inserted into the cap 45, FIG. 7, to form a skirt 75, FIG. 9, where the non-stick whipping 35 is still in the skirt insert 40, FIG. 6, so that the non-stick whipping 35 is inserted through the orifice 70, FIG. 6, of the cap 45, FIG. 7. The entire assembly is then cured so that the adhesive binds the skirt insert 40 to the cap 45. After the skirt is removed from the oven the non-stick whipping 35, FIG. 8, is removed from the skirt 75. The skirt 75, FIG. 9, is then formed.

There are several was that cure can be accomplished, the assembled skirt may be sent through a curing oven to cure the adhesive and promote the adhesion between the cap 45 and the skirt insert 40. Or the skirt might be set out at room temperature, defined to be between from 20 to 25° C. for a period of time long enough to effectuate cure. If the skirt is manufacture in a region where the ambient temperatures regularly exceed the definition of room temperature, in excess of 25° C., then leaving the skirts out in this environment will also effectuate cure. In one of the embodiments of the invention, the method of producing a lure skirt comprises the steps of providing a heat source; and subjecting the formed skirt to the heat source allowing the adhesive to dry. The heat source may be an oven or a drier or any other means for radiating heat over the formed skirt. Other sources may include laying the skirts out under the sun or leaving them out where the ambient temperature is more than 20° C. for a time period long enough to effectuate cure.

The flexible sheet of the invention can be any flexible sheet and may include silicone, siloxane polymers, rubber, synthetic rubber, Mylar, polyethylene, polypropylene, polybutylene, polyester and combinations thereof. In one embodiment the flexible sheet is a silicone sheet, which encompasses several variations of siloxane polymers.

Figure 5:
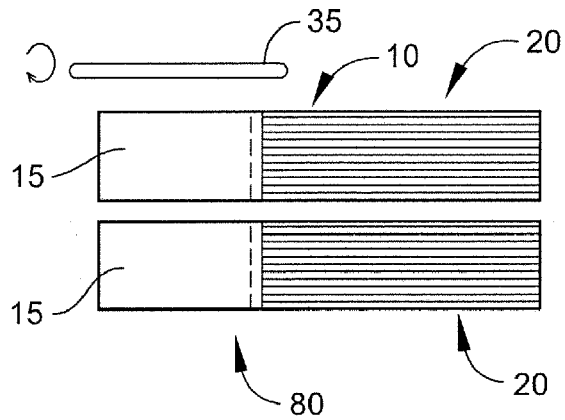
FIG. 5 is a perspective view of an alternative embodiment of the invention with two silicone sheets having tabs and a plurality of cut strands.

In an alternate embodiment more than one silicone sheet 10 and 80, FIG. 5, having a tab 15 and cut strands 20 can be wrapped around the whipping 35. This may be done to add additional cut strands or colors to the finished skirt.

Figure 4:
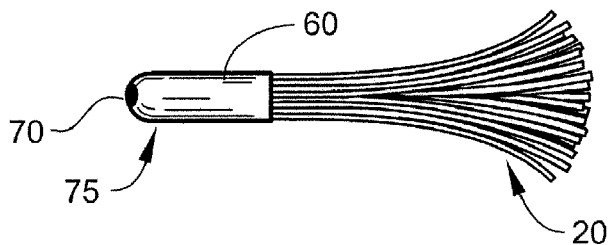
FIG. 4 is a perspective view of the finished skirt.

A skirt for a fishing lure is taught by this invention, which comprises: a cap 45, FIG. 3, the cap being tubular 60 having a first open end 50 and a closed second end 55 and a tubular portion 60 which has an inside surface 65. In one embodiment the closed end 55 has an orifice 70. It will be know to one skilled in the art that the cap can be made without the orifice 70, which can later be added by inserting a sharp article through the skirt insert. A rolled flexible sheet having a tab FIG. 2, 15, and a plurality of cut strands 20 is inserted into the cap 45 to form a skirt 75, FIG. 4. The tab 15, FIG. 2, forms a tubular portion on the skirt insert 40 which is sized to fit within the cap 45, FIG. 3. The skirt insert 40 is than adhesively bound inside the cap 45 to produce the skirt 75, FIG. 4.

The adhesive that binds the cap 45 to the skirt insert 40 may either be excess adhesive on the skirt insert as a result of the process of rolling it up or adhesive that is applied to the inside 65 of the cap 45. In another embodiment of the invention the second side 30 can be rolled around the whipping 35 to leave the adhesive on the outside of the tab insert or adhesive can be applied to both the first side 25 and the second side 30 so the insert will already have adhesive on the tab 15 of the skirt insert. In another embodiment adhesive can be applied to the outside of tab 15 of the skirt insert prior to insertion into the cap 45.

The cap 45 may be made of the same material as the flexible sheet or it may be made of a different material. The cap may be made of a non-flexible material such as a metal or hard plastic. If the cap 45 is made of a different material the material must be selected from a group that will also work with the adhesive being used. In one embodiment of the invention the cap is made from a silicone, which encompasses several variations of siloxane polymers. In another embodiment of the invention the cap is made from a metal or hard plastic where the inside of the cap has a rough surface to aid with adhesion by the adhesive.

The skirt 75 uses an adhesive to bond the tab 15 of the silicone sheet 10 together to form the skirt insert 40 and to bond the skirt insert 40 inside of the cap 45. While any type of adhesive can be used it has been found that a RTV (room temperature vulcanizing) adhesive works well in this application. In another embodiment the adhesive is selected from the group of ChemLock 697 or Lock Tight.

In another embodiment of the invention a layer or strip of solid uncured, tacky silicone rubber is applied to one surface of the tab 15, with the uncured strip being on the side of the skirt which will face outwardly upon assembly. The uncured layer is soft and tacky and is furnished in calender sheet form. While various types of uncured silicone elastomers are available, the type used in the present invention is millable high consistency silicone elastomers. These elastomers can be cured by at least two mechanisms, namely free radical cure using peroxide catalysts, or addition cure using a noble metal such as platinum. Silicone elastomers capable of additional curing can have enhanced physical properties. This type of curing system is also discussed in Applicant's U.S. Pat. No. 6,418,659.

These uncured elastomers, together with any additives and curing agents, are mixed in a mill and passed through a calender to form sheets which feel tacky. These sheets are then applied to the flexible sheet in a similar fashion to how the adhesive would be applied. These sheets are then subject to curing using heat at temperatures and durations specified by the resin supplier.

The flexible sheet 10 of the lure skirt may have a color component which can be incorporated directly into the strands. These strands may incorporate a color additive which is selected from the group consisting of: pigment, dye, color, glitter, mica, or combinations thereof. The step of coloring the flexible sheets prior to providing the flexible sheet is produced by the process of adding in a color component supplied by an additive selected from the group consisting of: pigment, dye, color, glitter, mica, or combinations thereof to a flexible precursor prior to extrusion. Then the precursor mixed with the color component, are extruded into a flexible sheet. The flexible sheet is then cut to a desired size. The flexible sheet 10 of the desired size is then cut to form strands 20 in the flexible sheet and a tab 15.

The skirt may also have another color component which can be incorporated directly into the cap 45. Here the color component of cap is selected from the group consisting of: pigment, dye, color, glitter, mica, or combinations thereof. The step of coloring a cap, prior to providing the cap is produced by the process of adding in a color component supplied by an additive selected from the group consisting of: pigment, dye, color, glitter, mica, or combinations thereof to a flexible precursor prior to extrusion. Then the precursor mixed with the color component, are extruded into a flexible cap 45.

If the cap 45 is metal then the color component may be coated or dyed on the metal cap.

Figure 10:
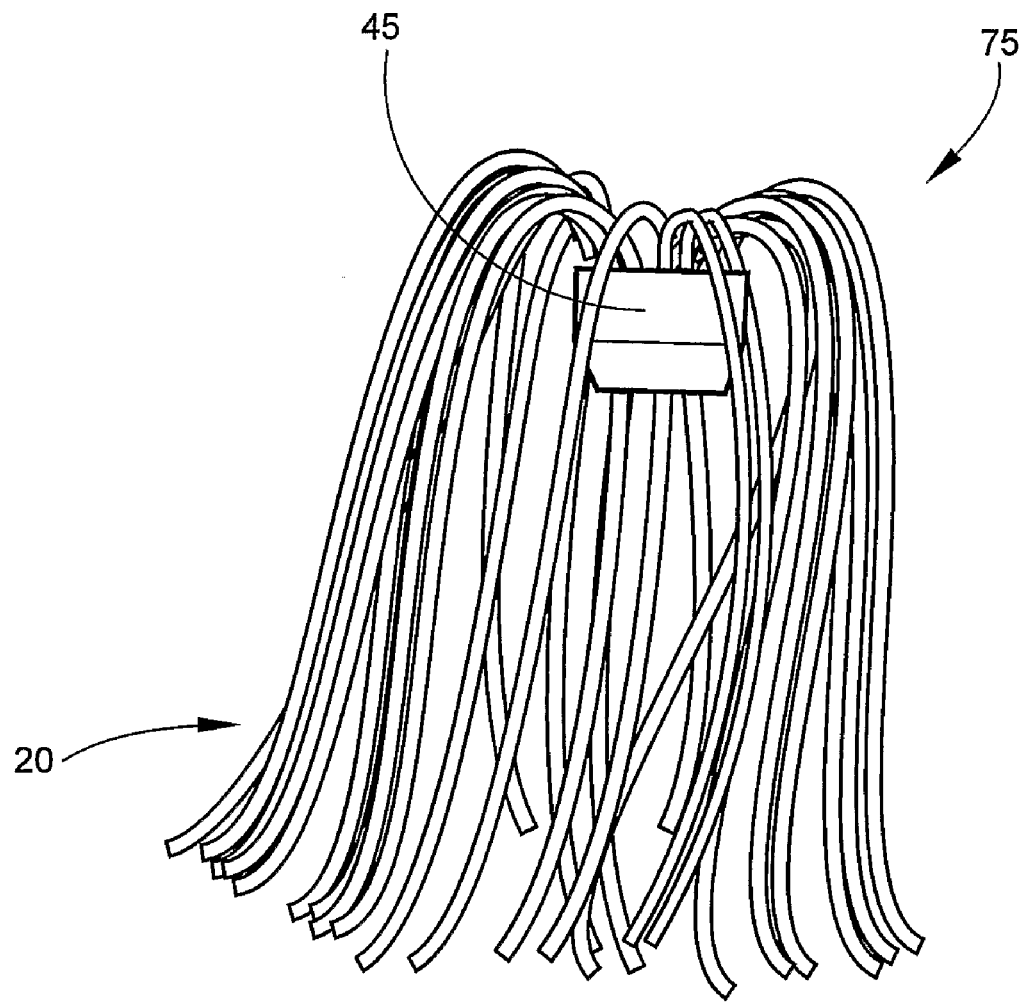
FIG. 10 is a perspective view of the skirt showing an umbrella effect.

In use the skirt 75, FIG. 10, maybe inverted and placed on a spinner bait or another lure which will accept a skirt, so that the cap 45 portion causes the strands 20 to flare an create an umbrella effect.

The silicone sheet 10, in another embodiment may be laminated with a holographic or colored foil. The holographic or colored foil refers to Mylar, plastic, or polyester sheets coated with chrome, gold, colored, or holographic coatings. Such foils are commercially available from, for example, 3M, Yeung Shiuann Co. or any laminated foil manufactures.

The lamination process shall be that of molding a sheet or tape of optically clear or translucent silicone elastomer. The molded sheet or tape will then be coated with a chemical locking agent (adhesive) such as ChemLock 697, RTV adhesive, or Lock Tight. Once coated, the sheet or tape will be heat cured. The heat curing assures that the chemical locking agent has bonded itself to the sheet or tape. The holographic or colored foil will then be coated with a chemical locking agent (adhesive). Once coated, the foil will heat cured to the sheet or tape under pressure. This same process can be done with the cap 45 except that the holographic or colored foil will then be coated with a chemical locking agent (adhesive) directly to the cap 45.

What is claimed is:

1. A method of making a skirt for a fishing lure comprising the steps of:

providing a flexible sheet having a tab and a plurality of cut strands, wherein said tab has a first side and a second side;

applying an adhesive to said first side;

rolling said first side of said silicone sheet about a non-stick whipping to form a skirt insert;

providing a cap, said cap being tubular, said cap having a first open end, a closed second end and a tubular portion having an inside surface, said closed end having an orifice;

inserting said skirt insert into said open end of said cap to form the skirt so that said non-stick whipping is inserted through said orifice of said cap;

curing said adhesive on said skirt insert and said cap to form the skirt; and removing said non-stick whipping to form the skirt.

2. The method of making a skirt for a fishing lure according to claim 1 where said flexible sheet is a silicone sheet.

3. The method of making a skirt for a fishing lure according to claim 2 further comprising the step of:

coloring said silicone sheet prior to providing said silicone sheet, by adding in a color component supplied by an additive selected from the group consisting of: pigment, dye, color, glitter, mica, and combinations thereof, prior to extruding and cutting said strands.

4. The method of making a skirt for a fishing lure according to claim 3 further comprising the steps of:

providing said silicone sheet prior to cutting;

providing a foil consisting of a colored foil, a metal foil, a holographic foil or a combination thereof;

affixing said foil to said silicone sheet with an adhesive to form a foil and silicone sheet composite;

applying heat and pressure to said foil and silicone sheet composite to form a foil and silicone sheet laminate;

cutting said foil and silicone sheet laminate to a desired size;

cutting strands in one end of said foil and silicone sheet laminate so that an opposite end thereof has said tab to form a cut foil and silicone sheet laminate; and providing said cut foil and silicone sheet laminate as said silicone sheet.

5. The method of making a skirt for a fishing lure according to claim 2 further comprising the steps of:

providing a plurality of silicone sheets, each sheet having a tab and a plurality of cut strands where said tab has a first side and a second side;

applying an adhesive to said first sides of said plurality of silicone sheets; and rolling said first side of each sheet of said plurality of silicone sheets about a non-stick whipping to form a skirt insert.

6. The method of making a skirt for a fishing lure according to claim 5 further comprising the step of:

coloring said plurality of silicone sheets prior to providing said plurality of silicone sheets, by adding in a color component supplied by an additive selected from the group consisting of: pigment, dye, color, glitter, mica, or combinations thereof, prior to extruding and cutting said strands in said silicone sheet.

7. The method of making a skirt for a fishing lure according to claim 6 where each of said plurality of silicone sheets has the same coloration, different coloration or combinations thereof.

8. The method of making a skirt for a fishing lure according to claim 6 further comprising the steps of:

providing one or more of said plurality of silicone sheets prior to cutting;

providing a foil consisting of a colored foil, a metal foil, a holographic foil or a combination thereof;

affixing said foil to said one or more of said plurality of silicone sheets with an adhesive to form a foil and silicone sheet composite;

applying heat and pressure to said foil and silicone sheet composite to form a foil and silicone sheet laminate;

cutting said foil and silicone sheet laminate to a desired size;

cutting strands in one end of said foil and silicone sheet laminate so that an opposite end thereof has a tab to form a cut foil and silicone sheet laminate; and providing said cut foil and silicone sheet laminate as one or more of said plurality of silicone sheets.

9. The method of making a skirt for a fishing lure according to claim 1, wherein the step of applying an adhesive further comprising the step of applying said adhesive to said inside surface of said tubular portion.

10. The method of making a skirt for a fishing lure according to claim 9 where said adhesive is a strip of uncured tacky elastomer.

11. The method of making a skirt for a fishing lure according to claim 1 further comprising the step of:

coloring said cap prior to providing said cap, by adding in a color component supplied by an additive selected from the group consisting of: pigment, dye, color, glitter, mica, and combinations thereof.

12. The method of making a skirt for a fishing lure according to claim 1 where said adhesive is a strip of uncured tacky elastomer.

* * * * *